(12) United States Patent
Hsieh et al.

(10) Patent No.: US 9,380,876 B2
(45) Date of Patent: Jul. 5, 2016

(54) BATHROOM RACK

(71) Applicant: JIN JU HAN INDUSTRIAL CORPORATION, Changhua (TW)

(72) Inventors: Cheng-I Hsieh, Changhua (TW); Tung-Shu Yao, Changhua (TW)

(73) Assignee: Jin Ju Han Industrial Corporation, Changhua (TW)

(*) Notice: Subject to any disclaimer, the term of this patent is extended or adjusted under 35 U.S.C. 154(b) by 0 days.

(21) Appl. No.: 14/690,826

(22) Filed: Apr. 20, 2015

(65) Prior Publication Data

US 2015/0327681 A1    Nov. 19, 2015

(30) Foreign Application Priority Data

May 15, 2014   (TW) .............................. 103208515 U

(51) Int. Cl.
*A47B 96/06* (2006.01)
*F16B 45/00* (2006.01)
*A47B 81/00* (2006.01)

(52) U.S. Cl.
CPC ................ *A47B 96/06* (2013.01); *A47B 81/00* (2013.01); *F16B 45/00* (2013.01)

(58) Field of Classification Search
CPC ........ A47B 96/06; A47B 81/00; A47B 3/281; A47B 10/10; A47B 5/00; A47B 1/09; A47B 2201/00; A47B 2201/02; A47B 2201/025; F16B 45/00; F16L 3/24; F16L 3/14; F16L 3/10; F16L 3/11; H02G 3/32
USPC ............. 248/62, 74.4; 211/119.009, 119.011, 211/85.12, 88.01, 90.01, 90.03, 106, 119
See application file for complete search history.

(56) References Cited

U.S. PATENT DOCUMENTS

| | | | | |
|---|---|---|---|---|
| 3,260,987 A | * | 7/1966 | Gunthel, Jr. ............. | H01R 4/32 403/399 |
| 3,552,257 A | * | 1/1971 | Tanabe .................... | F16B 37/16 411/368 |
| 4,911,387 A | * | 3/1990 | Daiglo ..................... | F16L 3/00 248/62 |
| 5,006,074 A | * | 4/1991 | Franks, Jr. ......... | B23K 37/0435 439/433 |
| 5,129,844 A | * | 7/1992 | Goto ........................ | H01R 4/32 411/2 |
| 5,181,621 A | * | 1/1993 | Plaehn ..................... | A47K 5/04 211/119.011 |
| 5,554,072 A | * | 9/1996 | Green .................. | G01F 23/268 439/101 |
| 5,601,262 A | * | 2/1997 | Wright ..................... | F16L 3/04 248/74.1 |
| 5,624,089 A | * | 4/1997 | Nadherny ............. | B60T 17/046 248/62 |

(Continued)

*Primary Examiner* — Patrick Hawn
(74) *Attorney, Agent, or Firm* — Che-Yang Chen; Law Offices of Scott Warmuth

(57) ABSTRACT

A bathroom rack may include a main body and at least two positioning units. The main body has a hanging portion at a rear portion thereof. Each of the positioning unit has a connecting head, a screw, and a cover. The connecting head has a first end and a second end, and the second end has a threaded connecting section. The cover has an inner hole that has a threaded connecting portion corresponding to the connecting section. A notch is formed at a periphery near a center portion of the positioning unit, and a locking hole toward the direction of the first end is located at a rear end of the notch, and the main body is configured to horizontally slide into the notch of the connecting head through the hanging portion to engage with the connecting head.

8 Claims, 6 Drawing Sheets

(56) References Cited

U.S. PATENT DOCUMENTS

| | | | | |
|---|---|---|---|---|
| 5,743,498 A * | 4/1998 | Kampf | F16L 3/24 248/62 |
| 6,012,692 A * | 1/2000 | Meck | A47K 10/10 248/222.14 |
| 6,220,460 B1 * | 4/2001 | Pan | A47K 10/10 211/105.1 |
| 6,250,044 B1 * | 6/2001 | Funk | A47K 10/10 211/105.2 |
| 6,581,896 B1 * | 6/2003 | Olexovitch | A47G 7/044 248/222.14 |
| 7,566,250 B1 * | 7/2009 | Good | H01R 4/32 174/78 |
| 7,585,312 B2 * | 9/2009 | Rawlins | A61B 17/7041 606/246 |
| 8,132,766 B2 * | 3/2012 | Tooley | A47K 5/18 248/205.5 |
| 8,336,837 B2 * | 12/2012 | Gephart | F16B 2/12 248/218.4 |
| 8,382,051 B2 * | 2/2013 | Smith | A47K 10/10 211/105.1 |
| 8,474,632 B2 * | 7/2013 | Yang | A47K 3/281 211/119.009 |
| 8,573,416 B2 * | 11/2013 | Didehvar | A47B 45/00 211/119.009 |
| 9,287,637 B2 * | 3/2016 | Therrien | H01R 4/38 |
| 2002/0158033 A1 * | 10/2002 | Chen | A47K 5/03 211/103 |
| 2004/0187204 A1 * | 9/2004 | Ouyoung | A47K 10/04 4/576.1 |
| 2004/0221382 A1 * | 11/2004 | Ouyoung | A47K 10/04 4/559 |
| 2005/0211860 A1 * | 9/2005 | Broyles | A47K 10/10 248/251 |
| 2005/0263655 A1 * | 12/2005 | Bauer | A47K 10/10 248/223.31 |
| 2006/0156466 A1 * | 7/2006 | Chang | A47K 3/003 4/576.1 |
| 2008/0047913 A1 * | 2/2008 | Naden | A47K 3/281 211/119.009 |
| 2009/0308995 A1 * | 12/2009 | Kuo | A47K 10/10 248/231.91 |
| 2010/0133218 A1 * | 6/2010 | Yang | A47K 3/281 211/119.009 |
| 2010/0264277 A1 * | 10/2010 | Gardner | F16L 3/133 248/58 |
| 2013/0126681 A1 * | 5/2013 | Greenfield | F16L 3/11 248/62 |
| 2014/0084118 A1 * | 3/2014 | Tooley | A47K 10/10 248/205.3 |
| 2015/0182025 A1 * | 7/2015 | Kuo | A47K 10/10 211/119.009 |
| 2015/0229043 A1 * | 8/2015 | Esmacher | H01R 4/38 439/811 |

* cited by examiner

BATHROOM RACK

FIELD OF THE INVENTION

The present invention relates to a bathroom rack, and more particularly to a bathroom rack that can be more stably secured to prevent from falling off when external force is applied.

BACKGROUND OF THE INVENTION

Conventionally, a bathroom rack has one or more locking holes on the rack structure to receive the screws, which can be drilled into the wall to secure the rack. When in use, toiletries are placed and organized on the rack.

However, the screws can be seen with the bathroom rack, which reduces the aesthetic value of the bathroom rack. Also, the bathroom rack structure is not stable. Therefore, there remains a need for a new and improved bathroom rack to overcome the problems presented above.

SUMMARY OF THE INVENTION

The present invention provides a bathroom rack that includes a main body and at least two positioning units. The positioning unit has a connecting head, a screw, and a cover. The main body has a basket and hanging portion. A stick extends downwardly from a lateral side of the basket, or a receiving space is formed underneath the basket. The connecting head has a first end and a second end with a reduced size, and the second end has a threaded connecting section. A notch is formed at a periphery near a center portion of the positioning unit, and a locking hole toward the direction of the first end is located at a rear end of the notch. The cover has an inner hole that has a threaded connecting portion.

Comparing with conventional bathroom racks, the present invention is advantageous because (i) the cover can cover the screw to increase the aesthetic value of the main body, and the cover can also be used as a decorative unit; and (ii) the main body is secured in the notch, the opening of which can be sealed by the cover to prevent the main body from falling off when external force is applied to the main body.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
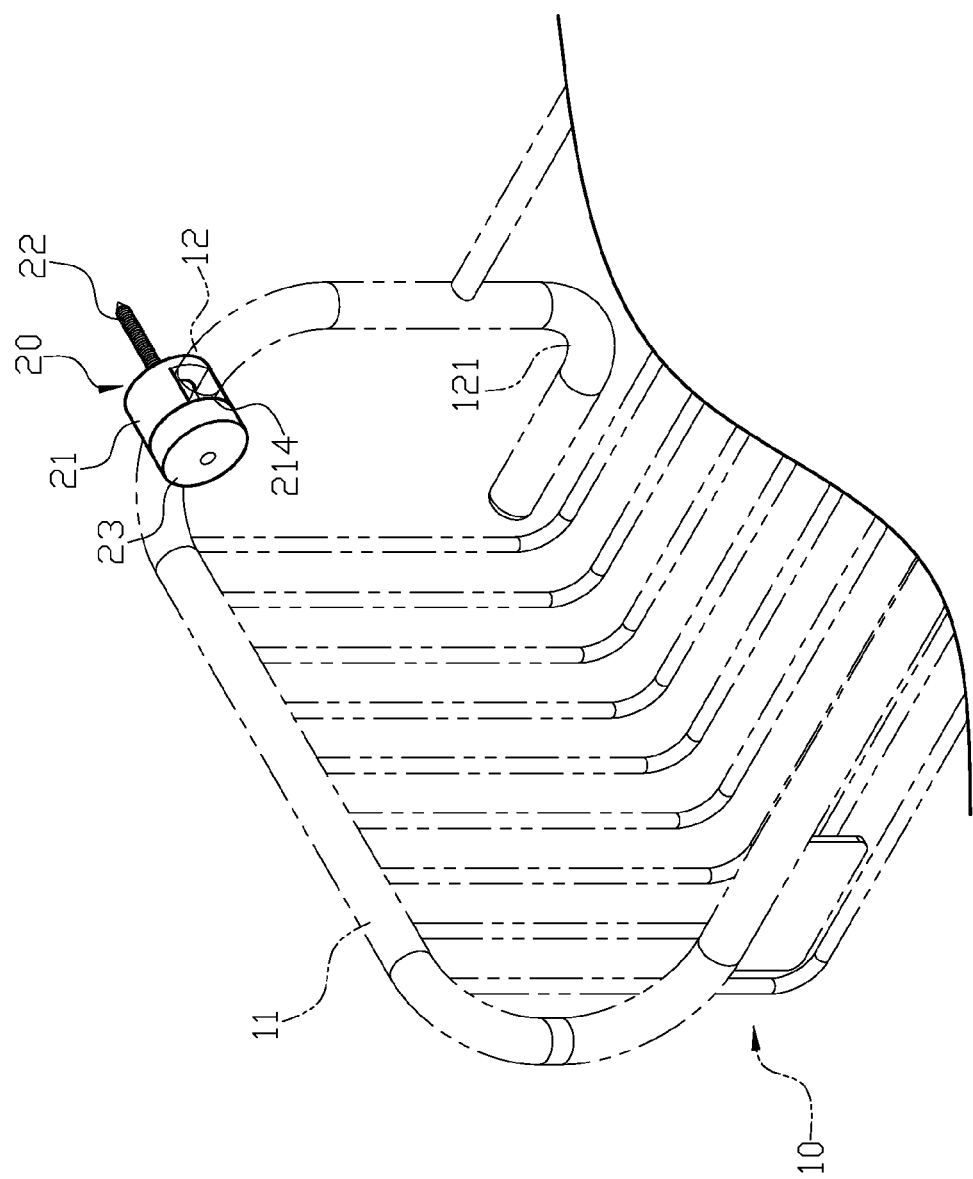
FIG. 1 is a three-dimensional view of the bathroom rack in the present invention.
Figure 2:
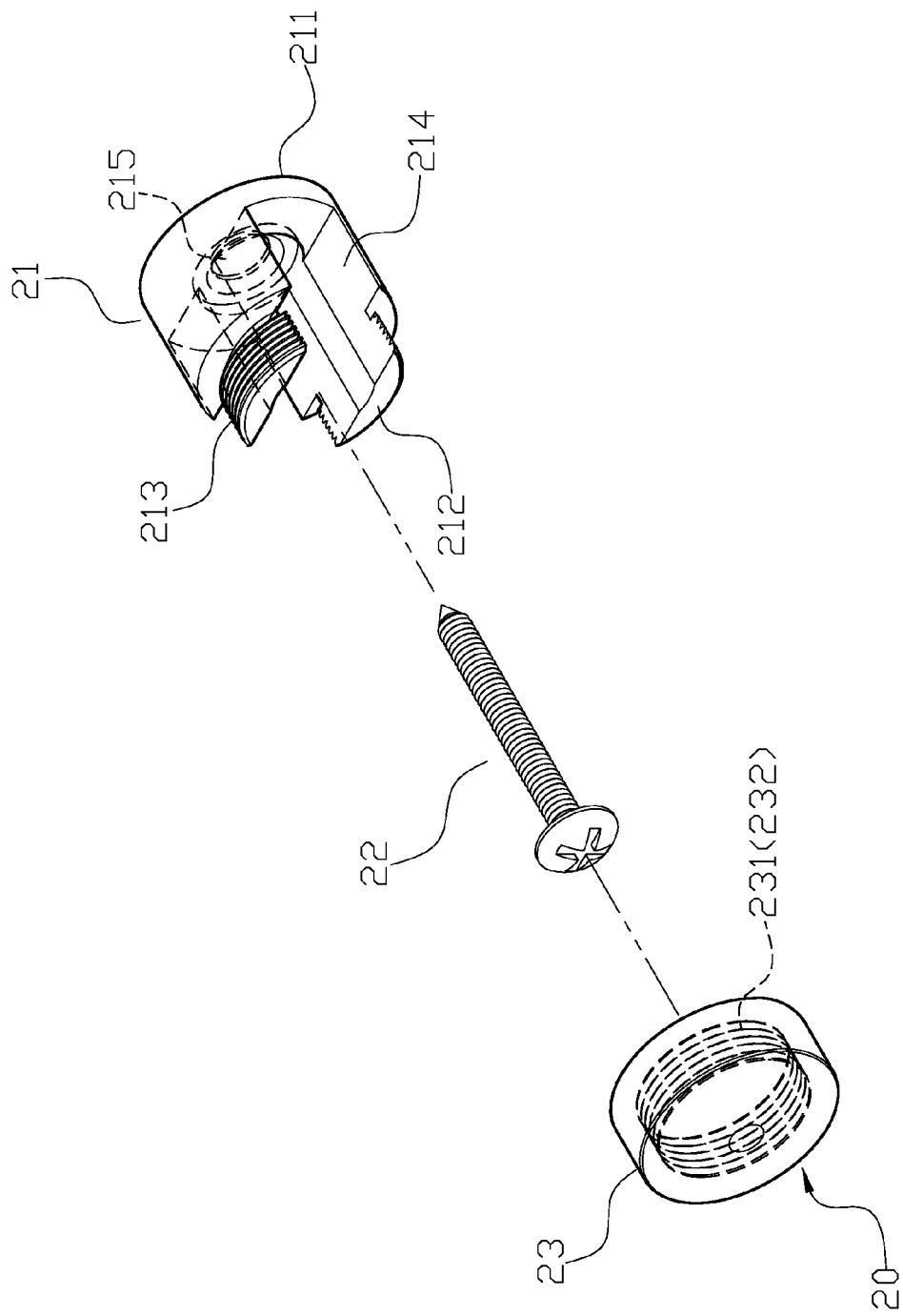
FIG. 2 is an exploded view of the bathroom rack in the present invention.
Figure 3:
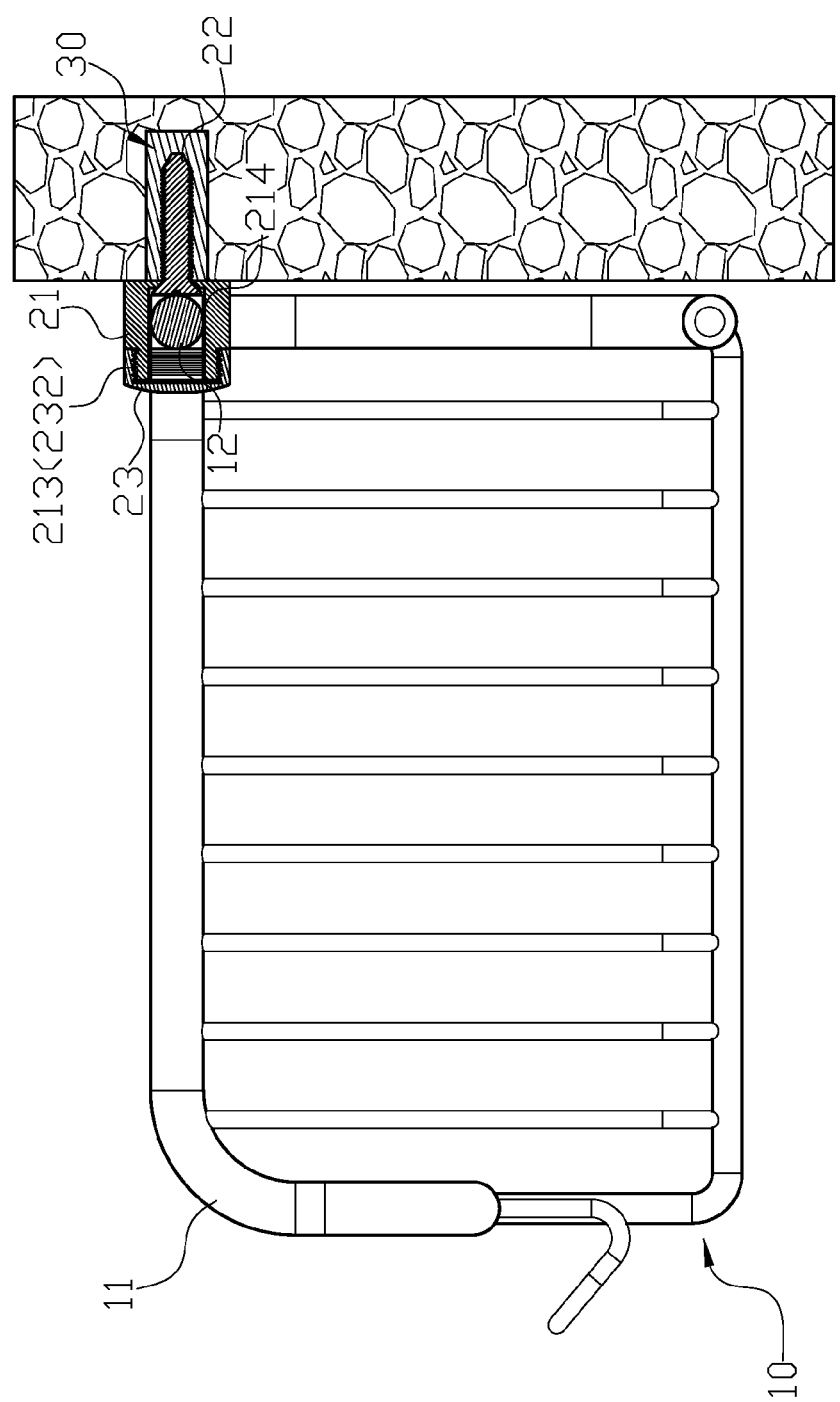
FIG. 3 is a sectional view of the bathroom rack of the present invention when being secured against the wall.
Figure 4:
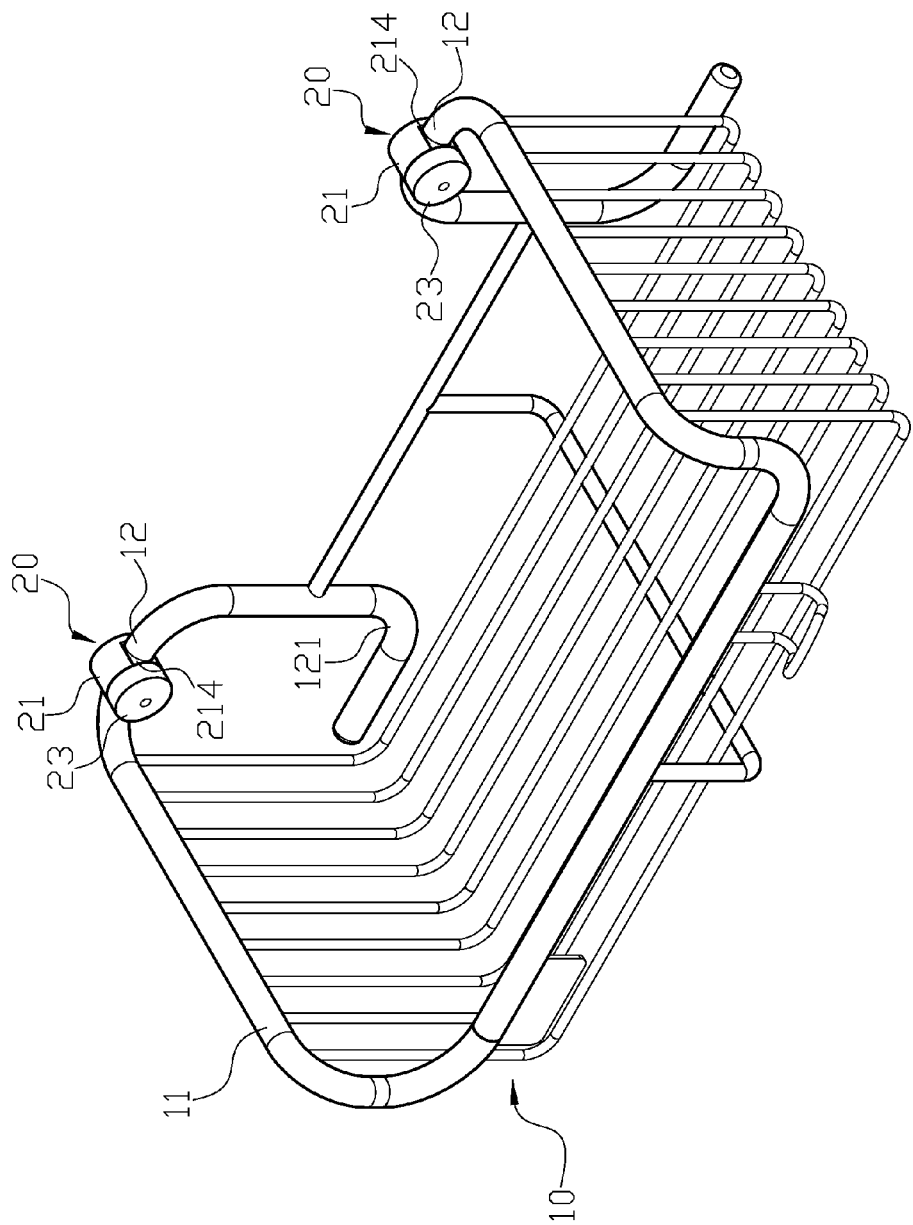
FIG. 4 is a three-dimensional view of the bathroom rack of the present invention when being secured against the wall.
Figure 5:
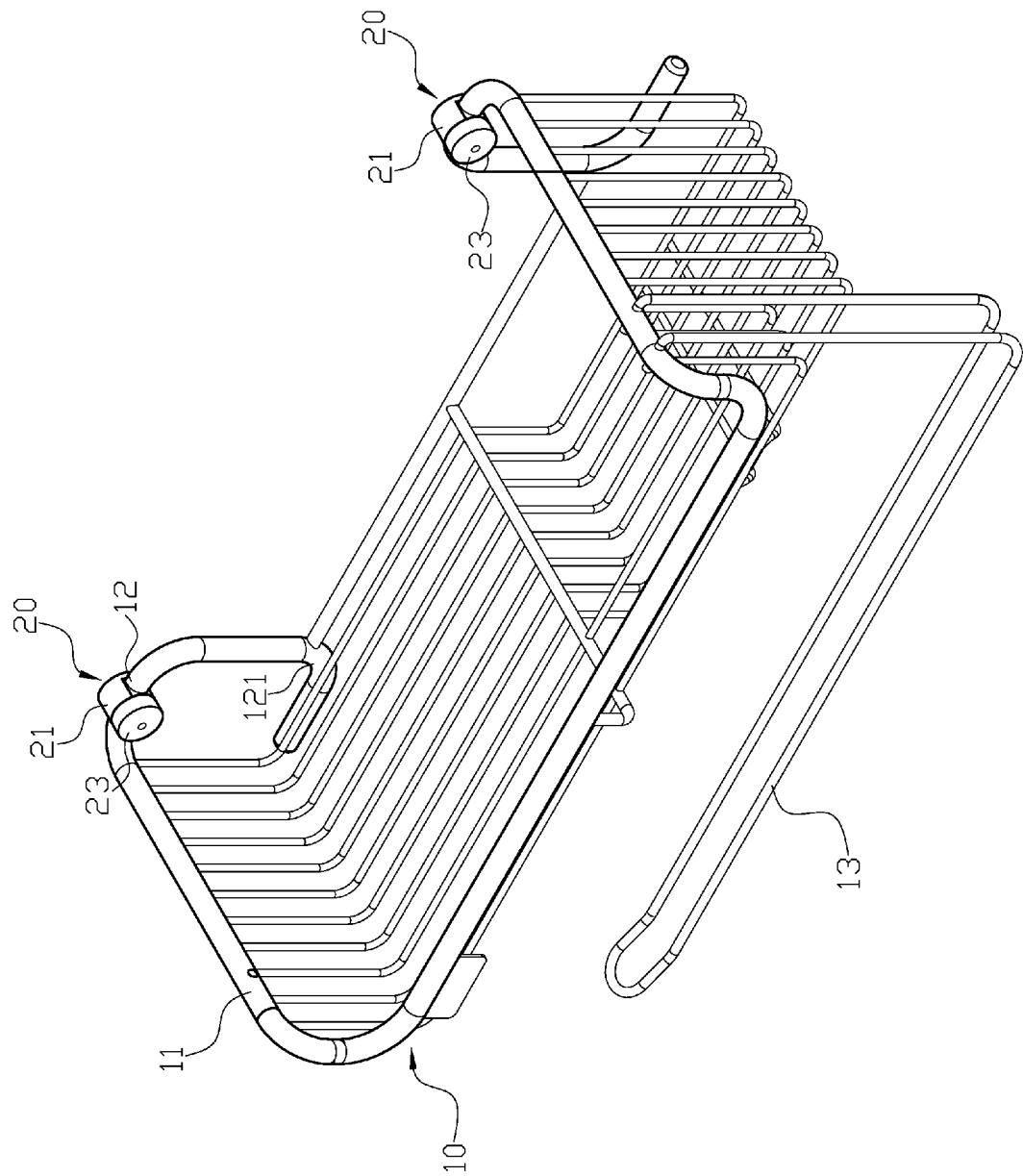
FIG. 5 is a schematic view of the bathroom rack of the present invention with the stick.
Figure 6:
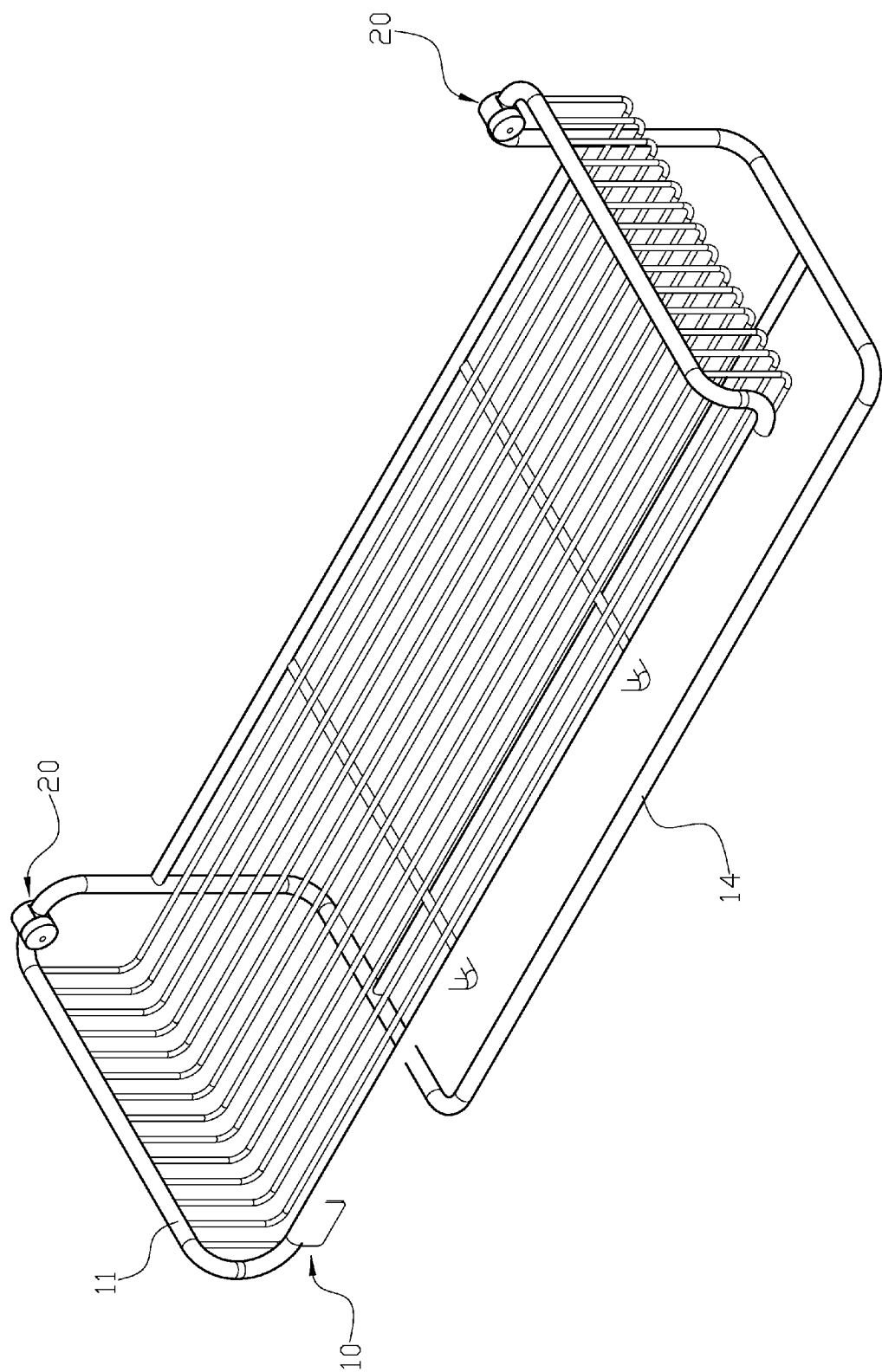
FIG. 6 is a schematic view of the bathroom rack of the present invention with the receiving space.

In order to further understand the goal, characteristics and effect of the present invention, a number of embodiments along with the drawings are illustrated as following:

Referring to FIGS. 1 and 4, the present invention provides a bathroom rack that includes a main body (10) and at least two positioning units (20). The positioning unit 20 has a connecting head (21), a screw (22), and a cover (23). The main body (10) has a basket (11) and hanging portion (12). A stick (13) extends downwardly from a lateral side of the basket (11) (see FIG. 5), or a receiving space (14) is formed underneath the basket (11) (see FIG. 6). The connecting head (21) has a first end (211) and a second end (212) with a reduced size, and the second end (212) has a threaded connecting section (213). A notch (214) is formed at a periphery near a center portion of the positioning unit (20), and a locking hole (215) toward the direction of the first end (211) is located at a rear end of the notch (214). The cover (23) has an inner hole (231) that has a threaded connecting portion (232).

In one embodiment, a hook portion (121) is formed at a lower portion of the hanging portion (12).

Referring to FIGS. 3 to 6, when in use, the user has to drill holes on the wall and inserts a plastic receiving unit (30), so the screw (22) can insert into the locking hole (215) of the connecting head (21) and be secured in the plastic receiving unit (30). Through the pressure from the screw (22), the connecting head (21) can securely attach to the wall surface through the first end (211). The main body (10) is configured to horizontally slide into the notch (214) of the connecting head (21) through the hanging portion (12) to engage with the connecting head (21). When the connecting section (213) of the cover (23) engages with the connecting portion (232) to connect to the second end (212) of the connecting head (21), the main body (10) can be securely positioned by the connecting head (21) and cover (23). It is noted that the cover (23) can not only cover the screw (22) but also seal the opening of the notch (214).

Comparing with conventional bathroom racks, the present invention is advantageous because (i) the cover (23) can cover the screw (22) to increase the aesthetic value of the main body (10), and the cover (23) can also be used as a decorative unit; and (ii) the main body (10) is secured in the notch (214), the opening of which can be sealed by the cover (23) to prevent the main body (10) from falling off when external force is applied to the main body (10).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A bathroom rack comprising:
   a main body having a hanging portion at a rear portion thereof; and
   at least two positioning units, each having a connecting head, a screw, and a cover, wherein the connecting head has a first end and a second end, and the second end has a threaded connecting section, and the cover has an inner hole that has a threaded connecting portion corresponding to the connecting section,
   wherein a notch is formed at a periphery near a center portion of the positioning unit, and a locking hole toward the direction of the first end is located at a rear end of the notch, and
   wherein the screw is inserted into the locking hole of the connecting head and be secured in a plastic receiving unit, and through the pressure applied from the screw, the connecting head is securely attached to the wall surface through the first end; the main body is configured to horizontally slide into the notch of the connecting head through the hanging portion to engage with the connecting head, and when the connecting section of the cover engages with the connecting portion to connect to the second end of the connecting head, the main body is securely positioned by the connecting head and cover.

2. The bathroom rack of claim 1, wherein the main body is a basket.

3. The bathroom rack of claim 2, wherein a stick extends downwardly from a lateral side of the basket.

4. The bathroom rack of claim 2, wherein a receiving space is formed underneath the basket.

5. The bathroom rack of claim 1, wherein a hook portion is formed at a lower portion of the hanging portion.

6. The bathroom rack of claim 1, wherein the diameter of the second end is smaller than the first end.

7. The bathroom rack of claim 1, wherein the connecting portion and connecting section are engaged with each other through the threads thereof.

8. The bathroom rack of claim 1, wherein the main body is secured in the notch, an opening of which can be sealed by the cover to prevent the main body from falling off when external force is applied to the main body.

* * * * *